(12) United States Patent
Dietrich et al.

(10) Patent No.: US 8,314,170 B2
(45) Date of Patent: Nov. 20, 2012

(54) DISPERSING AGENTS

(75) Inventors: Ulf Dietrich, Wachenheim (DE); Anke Reinschmidt, Ann Arbor, MI (US)

(73) Assignee: Wacker Chemie AG, Munich (DE)

( * ) Notice: Subject to any disclaimer, the term of this patent is extended or adjusted under 35 U.S.C. 154(b) by 1191 days.

(21) Appl. No.: 10/551,108

(22) PCT Filed: Mar. 4, 2004

(86) PCT No.: PCT/EP2004/002211
§ 371 (c)(1),
(2), (4) Date: Jul. 11, 2006

(87) PCT Pub. No.: WO2004/085335
PCT Pub. Date: Oct. 7, 2004

(65) Prior Publication Data
US 2006/0264565 A1 Nov. 23, 2006

(30) Foreign Application Priority Data
Mar. 27, 2003 (DE) .................................. 103 13 937

(51) Int. Cl.
*C08K 5/16* (2006.01)
(52) U.S. Cl. .......................... 524/200; 524/558; 528/272
(58) Field of Classification Search .................... 524/558
See application file for complete search history.

(56) References Cited

U.S. PATENT DOCUMENTS

| | | | | |
|---|---|---|---|---|
| 4,137,088 | A | * 1/1979 | Debus et al. .................. | 106/728 |
| 5,362,829 | A | 11/1994 | Kinoshita et al. | |
| 5,919,881 | A | 7/1999 | Kinoshita | |
| 6,127,483 | A | * 10/2000 | Weitzel et al. ................ | 525/189 |
| 6,166,113 | A | * 12/2000 | Haerzschel et al. ............. | 524/5 |

FOREIGN PATENT DOCUMENTS

| | | | |
|---|---|---|---|
| DE | 195 38 821 | A1 | 10/1996 |
| DE | 195 39 460 | A1 | 4/1997 |
| DE | 198 06 482 | A1 | 8/1999 |
| DE | 100 63 291 | A1 | 6/2002 |
| EP | 0448717 | * | 2/1991 |
| EP | 0 590 983 | A1 | 4/1994 |
| EP | 0 792 850 | A1 | 9/1997 |
| EP | 0 816 298 | A1 | 1/1998 |
| EP | 1 090 901 | * | 4/2001 |
| EP | 1 090 901 | A2 | 4/2001 |
| JP | 10017346 | A | 1/1998 |
| JP | 2002362952 | A | 12/2002 |
| WO | WO 97/13732 | | 4/1997 |
| WO | WO 00/75208 | A1 | 12/2000 |

OTHER PUBLICATIONS

Okazaki, Derwent Abstract of JP 09-249442, Jan. 1998.* Derwent Abstract corres. to DE 19806482 [AN 1999-432199].
Derwent Abstract corres. to DE 19538821 [AN 1996-455292].
Derwent Abstract corres. to DE 19539460 [AN 1997-238106].
Derwent Abstract corres. to DE 10063291 [AN 2002-629010].

* cited by examiner

*Primary Examiner* — Doris Lee
(74) *Attorney, Agent, or Firm* — Brooks Kushman P.C.

(57) ABSTRACT

Dispersing agents especially useful as cement plasticizers are copolymers obtained by polymerizing a) 5 to 70 percent by weight of ethylenically unsaturated monocarboxylic acids, carboxylic acid amides, dicarboxylic acids, or their anhydrides and/or (meth)acrylic acid monoesters of dialcohols, b) 1 to 40 percent ethylenically unsaturated, sulfonate-functional or sulfate-functional compounds, c) 10-80 percent of ethylenically unsaturated compounds of polyethylene glycols containing 1 to 300 ethylene oxide units, and terminal OH groups or —OR' ether groups, d) 5 to 80 percent of ethylenically unsaturated compounds of polyalkylene glycol containing 1 to 300 $C_{3-4}$ alkylene oxide units and terminal OH groups or —OR' ether groups, the percentages totaling 100 percent by weight.

7 Claims, 3 Drawing Sheets

Cement paste with conventional plasticizer

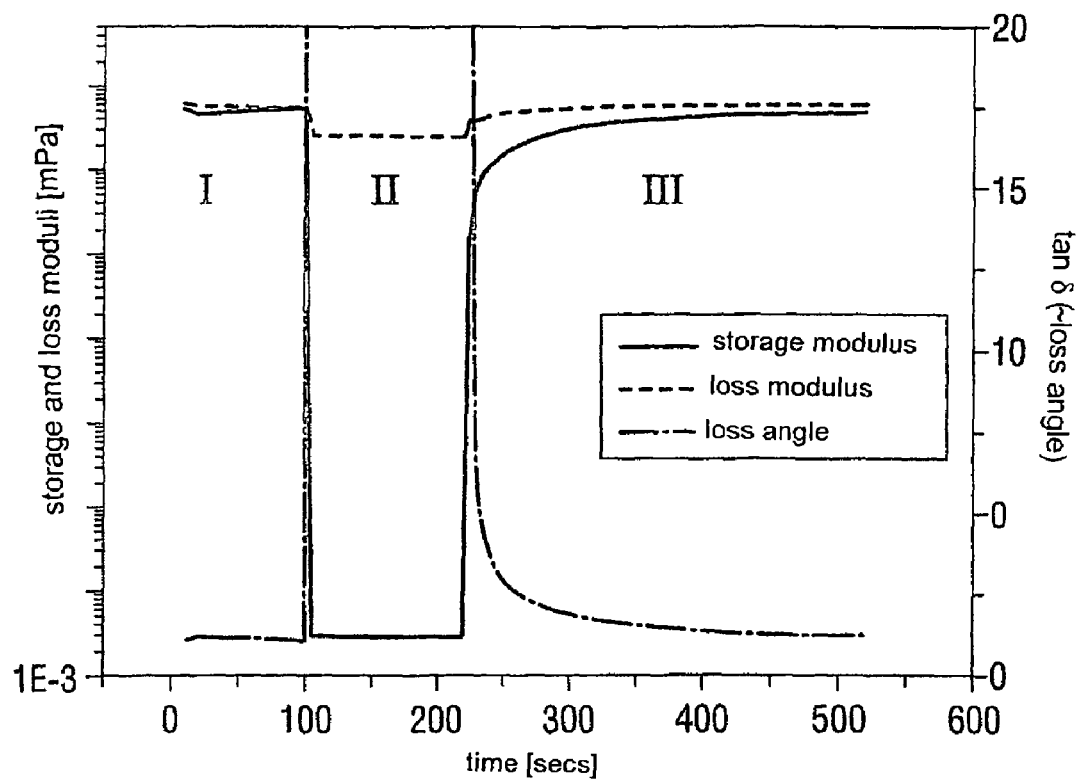
Fig. 1  Cement paste with conventional plasticizer

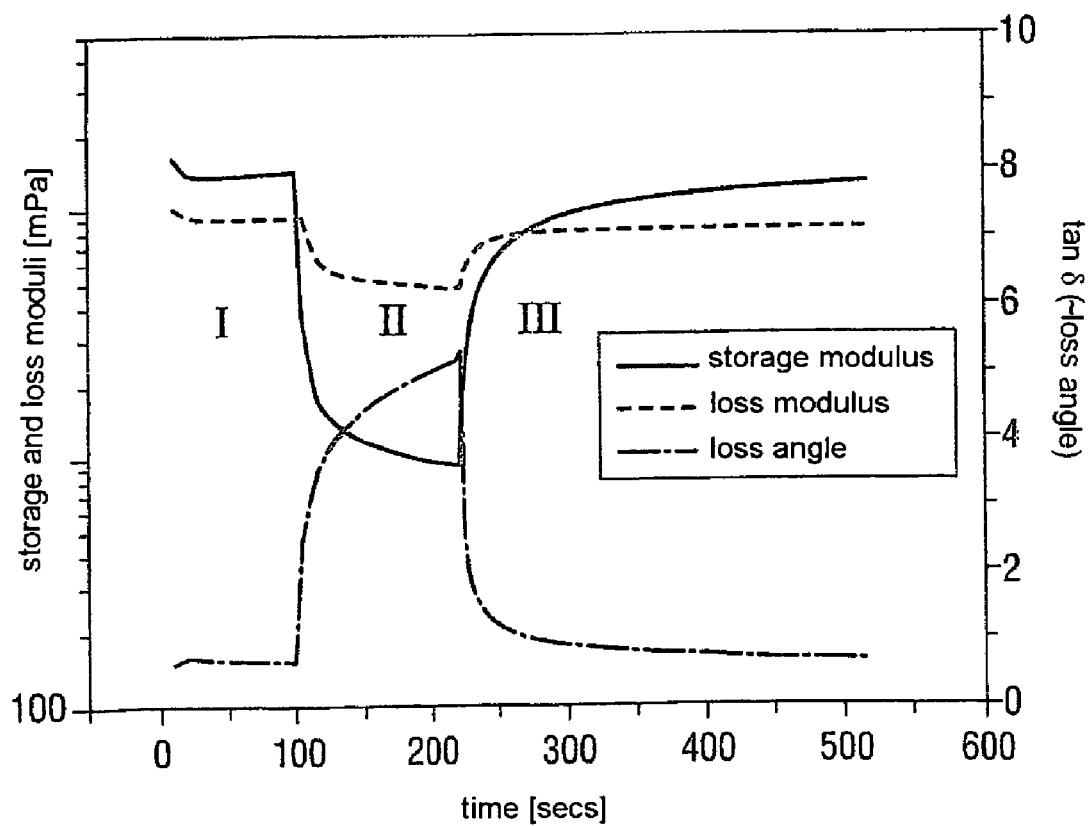
Fig. 2 Cement paste with casein

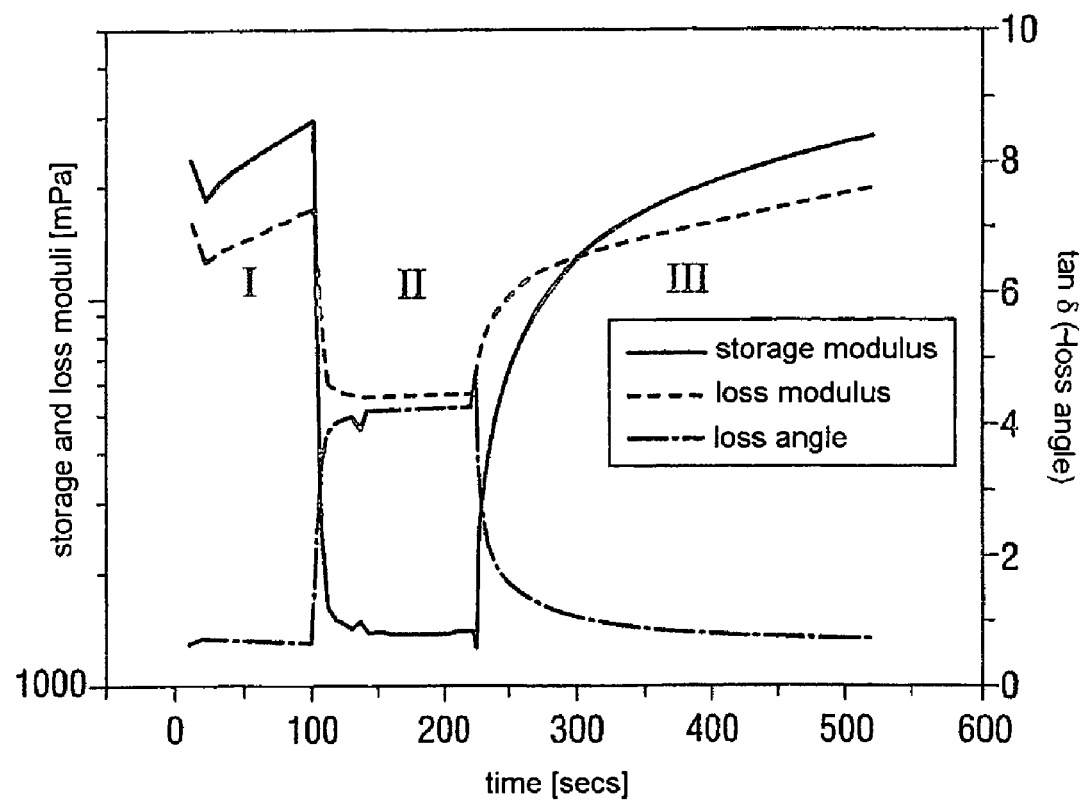
Fig. 3  Cement paste with powder 1

DISPERSING AGENTS

CROSS-REFERENCE TO RELATED APPLICATION

This application claims priority to PCT Appln. No. PCT/US2004/002211 filed Mar. 4, 2004, and to German application 103 13 937.0 filed Mar. 27, 2003.

BACKGROUND OF THE INVENTION

1. Field of the Invention

The invention concerns dispersants based on copolymers with polyoxyalkenyl functional groups, processes for the production thereof and use thereof.

2. Description of the Related Art

Dispersants are added to mortar mixtures based on inorganic binders such as cement, limestone and gypsum in order to improve their workability, for example their fluidity. In order to make such mortar mixtures available in a workable consistency, significantly more mixing water is generally necessary than for the hardening or hydration step for the consolidation of the mortar. This excess water content, evaporating during the hardening, leads to a worsening of the mechanical strength of the construction compounds. To improve the consistency, in other words the flowability, of mortar mixtures with a given water-binder ratio, dispersants, called plasticizers, are added.

As plasticizers for flowable hydraulically setting mortar systems, substances based on ligninsulfonate are known from WO-A 97/13732. DE-A 19538821 describes sulfonate-containing condensation products based on amino-s-triazines with at least two amino groups and formaldehyde. In WO-A 00/75208, condensation products of sulfonated aromatics and formaldehyde are described. However, there are some ecological objections to such plasticizers, at least for indoor applications, owing to the liberation of formaldehyde.

Also known, for example from DE-A 19539460, are plasticizers for cementitious systems based on 2-methyl-2-acrylamidopropanesulfonic acid or other strong polyelectrolytes. These dispersants can as a rule only be used in combination with emulsifier-stabilized polymer dispersions. In combination with the polyvinyl alcohol-stabilized dispersions mainly used in the construction sector, these have the disadvantage that they result in massive destabilization of polymer dispersions (leading to coagulation) or the redispersion powders produced therefrom. If a mixture with polyvinyl alcohol-stabilized dispersions does not coagulate immediately, this mainly manifests itself in the fact that in use the cement mixtures already stiffen markedly during mixing, set prematurely or the required degree of spreading of hydraulically setting fillers is no longer attained. In addition, there is usually a marked shrinkage of the cement matrix, which can result in fissuring.

A further disadvantage of the previously mentioned plasticizers is the fact that the plasticizing action does not persist over a sufficiently long period. This results in a shortening of the working time, which becomes a problem when there is a longer period between the mixing of the construction material mixtures and the working of these.

So-called high performance plasticizers exhibit a longer-lasting plasticizing action. From EP-A 792850, cement compositions are known which contain as plasticizers copolymers of short-chain polyalkylene glycol (meth)acrylates, long-chain polyalkylene glycol (meth)acrylates) and ethylenically unsaturated carboxylic acids. EP-A 590983 concerns cement plasticizers based on copolymers of (meth)acrylic acid, ethylenically unsaturated sulfonates, polyethylene glycol (meth)allyl ethers, esters of (meth)acrylic acid with polyethylene glycol monoethers and optionally (meth)acrylate esters. In DE-A 10063291, cement plasticizers based on polycarboxylates are described, wherein comonomer units with polyoxyalkylene groups and comonomer units with OH—, CO— or sulfonate groups are still contained in the copolymer. EP-A 816298 describes plasticizers which are obtained by copolymerization of monomers with polyoxyethylene functional groups, polyoxyethylene-polyoxypropylene group-containing monomers and comonomers with ethylenically unsaturated sulfonate functional groups.

These plasticizers are characterized by longer-lasting plasticizing action, but tend to water separation (bleeding). This is attended by impaired working (distribution on the substrate to be smoothed) and poor self-healing.

Further, casein is used as a plasticizer in flowable hydraulically setting mortar systems. Casein provides unique flow, working and self-healing properties for flowable hydraulically setting mortar systems and in addition has binder characteristics. Casein is a milk protein, which is obtained by acid precipitation. It is characterized by major quality variations depending on the particular season and fodder quality. This renders its use in flowable hydraulically setting mortar systems more difficult. Furthermore, after working, casein-containing flowable hydraulically setting mortar systems tend to the formation of mould cultures, which is not desirable in living areas.

The problem was therefore to provide dispersants which display a long-lasting plasticizing action in cement systems, are compatible both with emulsifier and also with protective colloid stabilized systems, and exhibit the advantageous rheological properties of casein.

SUMMARY OF THE INVENTION

These and other objects are achieved through dispersants based on copolymers obtainable by polymerization of a) 5 to 70 wt. % of one or more monomers from the group consisting of ethylenically unsaturated monocarboxylic acids, ethylenically unsaturated carboxamides, ethylenically unsaturated dicarboxylic acids and anhydrides thereof, each with 4 to 8 C atoms, and (meth)acrylate monoesters of dialcohols with 2 to 8 C atoms, b) 1 to 40 wt. % of one or more monomers from the group consisting of ethylenically unsaturated compounds with sulfonate or sulfate functional groups, c) 10 to 80 wt. % of one or more monomers from the group consisting of ethylenically unsaturated compounds of polyethylene glycols with 1 to 300 ethylene oxide units, and terminal OH-groups or ether groups —OR', wherein R' can be an alkyl, aryl, alkaryl or aralkyl residue with 1 to 40 C atoms, d) 5 to 80 wt. % of one or more monomers from the group consisting of ethylenically unsaturated compounds of polyethylene glycols with 1 to 300 alkylene oxide units from alkylene groups with 3 to 4 C atoms, and terminal OH-groups or ether groups —OR', wherein R' can be an alkyl, aryl, alkaryl or aralkyl residue with 1 to 40 C atoms, each based on the total weight of the copolymer, the stated amounts in wt. % totaling 100 wt. %.

BRIEF DESCRIPTION OF THE DRAWINGS

FIGS. 1-3 are rheology curves for cementitious compositions containing various plasticizing additives.

DETAILED DESCRIPTION OF THE PREFERRED EMBODIMENT

Suitable monomers a) are acrylic acid, methacrylic acid, itaconic acid, fumaric acid, maleic acid, and the salts of the said carboxylic acids, maleic anhydride, acrylamide, methacrylamide, hydroxyethyl (meth)acrylate, hydroxypropyl (meth)acrylate and hydroxybutyl (meth)acrylate. Preferred are acrylic acid and methacrylic acid and salts thereof. The monomer units a) are preferably copolymerized in an amount of 5 to 40 wt. %, especially preferably 10 to 25 wt. %.

Suitable monomers b) are vinylsulfonic acid and alkali and alkaline earth metal salts thereof, styrenesulfonic acid and alkali and alkaline earth metal salts thereof, methallylsulfonic acid and alkali and alkaline earth metal salts thereof, p-methallyloxyphenylsulfonic acid and alkali and alkaline earth metal salts thereof, and sulfonic acids of the general formula $CH_2=CR^1-CO-X-CR^2R^3-R^4-SO_3H$ and alkali and alkaline earth metal salts thereof, wherein X=O or NH, and $R^1$, $R^2$ and $R^3$ are the same or different and have the meaning H and $C_1$ to $C_3$ alkyl, and $R^4$ is $C_1$ to $C^4$ alkylene. Preferred are 2-acrylamido-2-methylpropanesulfonic acid and methallylsulfonic acid and respective alkali and alkaline earth metal salts thereof. Especially preferred are mixtures of 2-acrylamido-2-methylpropanesulfonic acid (salt) and methallylsulfonic acid (salt). The monomer units b) are preferably copolymerized in an amount of 1 to 20 wt. %, especially preferably 5 to 15 wt. %.

Preferred monomers c) are the acrylate esters and methacrylate esters of polyethylene glycols and alkyl ethers thereof with 1 to 6 C atoms, each with 1 to 150 ethylene oxide units. Especially preferred are the acrylate esters and methacrylate esters of polyethylene glycols each with 20 to 150 ethylene oxide units and each with a terminal hydroxy group or methoxy group. The monomer units c) are preferably copolymerized in an amount of 30 to 70 wt. %.

Preferred monomers d) are the acrylate esters and methacrylate esters of polypropylene glycols and polybutylene glycols and also alkyl ethers thereof with 1 to 6 C atoms, each with 3 to 100 alkylene oxide units. Especially preferred are the acrylate and methacrylate esters of polypropylene glycols with 3 to 50 propylene oxide units and with a terminal hydroxy or methoxy group. Preferably the said acrylate esters and methacrylate esters of polypropylene glycols or polybutylene glycols are copolymerized in an amount of 5 to 35 wt. %.

In a further preferred embodiment, the monomer units d) are derived from acrylate esters and methacrylate esters of polypropylene glycols and polybutylene glycols, especially preferably polypropylene glycols, which contain 3 to 35 propylene oxide or butylene oxide units, capped with 5 to 80 ethylene oxide units. These monomer units are copolymerized in an amount of 30 to 70 wt. %.

Optionally, hydrophobic comonomer units e) which are derived from (meth)acrylate esters of alcohols with 1 to 15 C atoms or vinylaromatics can also be contained. Examples of these are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate, styrene and vinyltoluene. If comonomer units e) are contained, then their amount is 0.5 to 10 wt. %.

The production of the copolymers is effected by radical-initiated polymerization, preferably in an aqueous medium at a temperature of 40° C. to 95° C., or in a bulk, solution or gel polymerization at a temperature of 40° C. to 150° C. Suitable initiators are water-soluble initiators such as the sodium, potassium and ammonium salts of peroxodisulfuric acid, hydrogen peroxide, t-butyl peroxide, t-butyl hydroperoxide, potassium peroxodiphosphate, tert.-butyl peroxypivalate, cumene hydroperoxide, isopropylbenzene monohydroperoxide, azobisisobutyronitrile, 2,2'-azobis(2-methylpropionamidine)dihydrochloride and 2,2'-azobis[2-(2-imidazolin-2-yl)propane]dihydrochloride. The said initiators are generally used in an amount of 0.01 to 0.5 wt. %, based on the total weight of the monomers. Combinations of the said initiators with reducing agents can also be used. Suitable reducing agents are the sulfites and bisulfites of the alkali metals and of ammonium, for example sodium sulfite, derivatives of sulfoxylic acid such as zinc or alkali metal formaldehydesulfoxylates, for example sodium hydroxymethanesulfinate, and ascorbic acid. The quantity of reducing agent is preferably 0.01 to 2.5 wt. %, based on the total weight of the monomers.

To control the molecular weight, regulating substances can be used during the polymerization. If regulators are used, these are normally used in amounts between 0.01 to 5.0 wt. %, based on the monomers to be polymerized and metered in separately or else premixed with reaction components. Examples of such substances are n-dodecyl mercaptan, tert.-dodecyl mercaptan, mercaptopropionic acid, mercaptopropionic acid methyl ester, isopropanol and acetaldehyde.

The monomers can be introduced all together beforehand, be metered in all together or be introduced in portions beforehand, and the rest metered in after the initiation of the polymerization. The additions can be carried out separately (physically and chronologically) or some or all of the components to be added can be added preemulsified.

The aqueous solutions or aqueous dispersions of the copolymers thus obtainable can used as such as dispersants. The solutions or dispersions can also be dried, for example by drum or spray drying, and the copolymers used as powders. Irrespective of the presentation, the copolymers are suitable for use as dispersants, preferably as atomization aids in the spray drying of aqueous dispersions.

A further preferred use is as cement plasticizers. In the use of the dried or dissolved dispersants without polymer treatment they are used at 0.1 to 0.7 wt. %, based on the total mass of the cementitious dry mixture.

In an especially preferred embodiment, the dispersants are used as atomization aids in the spray drying of aqueous dispersions of homo- or copolymers of one or more monomers from the group consisting of vinyl esters of unbranched or branched alkylcarboxylic acids with 1 to 18 C atoms, acrylate esters or methacrylate esters of branched or unbranched alcohols with 1 to 15 C atoms, dienes, olefins, vinylaromatics and vinyl halides, and the redispersion powders redispersible in water thus obtainable are used for the modification of construction compounds. Most preferred is the use of the dispersant-containing redispersion powders as an additive with a plasticizing (dispersant) action, in particular for mineral binder systems or pigment-containing preparations.

Examples of preferred homo- and copolymers are vinyl acetate homopolymers, copolymers of vinyl acetate with ethylene, copolymers of vinyl acetate with ethylene and one or more other vinyl esters, copolymers of vinyl acetate with ethylene and acrylate esters, copolymers of vinyl acetate with ethylene and vinyl chloride, styrene-acrylate ester copolymers and styrene-1,3-butadiene copolymers.

For the production of the polymer powders redispersible in water, the aqueous dispersions of the polymers, after addition of the dispersants according to the invention as atomization aids, are dried, for example by fluidized bed drying, freeze drying or spray drying. Preferably, the dispersions are spray dried. In that case, the spray drying is effected in normal spray drying plants, wherein the atomization can take place via single-, two- or multi-fluid nozzles or with a rotating disk. The exit temperature is generally selected in the range from 45° C. to 120° C., preferably 60° C. to 90° C., depending on the plant, resin Tg and desired drying level.

As a rule, the dispersant is used in an total amount of 3 to 30 wt. %, based on the polymeric components of the dispersion. In other words, the total amount of dispersant before the drying procedure should be at least 3 to 30 wt. %, based on the polymer content; preferably, 5 to 20 wt. %, based on the polymer content, is used.

The polymer powder compositions redispersible in water thus obtainable can be used in the application fields typical for this. For example in construction chemical products, optionally in combination with hydraulically setting binders such as cements (Portland, aluminate, trass, slag, magnesia and phosphate cement), or gypsum, lime and waterglass, for the production of construction adhesives, in particular tiling adhesives and exterior insulation adhesives, plasters, fillers, floor fillers, leveling compounds, grouts, jointing mortars and paints, especially preferably in self-leveling floor fillers and flowable screeds.

Typical formulas of self-leveling, hydraulically setting mixtures contain 100 to 500 wt. parts of cement such as Portland cement and/or alumina cement, 300 to 800 wt. parts of fillers such as sand and/or limestone flour and/or silica dusts and/or fly ash, 0 to 200 wt. parts of anhydrite, hemihydrate and/or gypsum, 0 to 50 wt. parts of calcium hydroxide, 0 to 5 wt. parts of antifoaming agent, 0.5 to 10 wt. parts of dispersant, 1 to 100 wt. parts of redispersion powder, 0.5 to 5 wt. parts of retardants such as tartaric acid, citric acid or saccharides, 0.5 to 5 wt. parts of accelerators for example alkali metal carbonates, and 0.2 to 3 wt. parts of thickeners such as cellulose ethers, the amounts totaling 1000 wt. parts, and the dry mixture is stirred with the appropriate quantity of water depending on the consistency desired.

With the procedure according to the invention, dispersants are obtained which when used for self-leveling fillers (SLF) display a working consistency (rheology) and self-healing comparable to the casein-containing mixtures. Furthermore, these products are of low sensitivity to bacterial attack and can be produced with constant quality. The dispersants according to the invention are completely compatible with emulsifier or polyvinyl alcohol stabilized dispersions and can thus very simply be converted into redispersible dispersion powders, for example by spray drying.

The rheology of self-leveling, hydraulically setting compounds can be characterized by the following parameters:

Storage modulus G' [Pa]:

Measure of the deformation energy stored in the substance during the shearing process. This energy is completely available after removal of the load. G' represents the elastic behavior of the measurement sample.

Loss modulus G" [Pa]:

Measure of the deformation energy consumed in the substance during the shearing process and thus lost to the substance. This energy is either consumed in altering the structure of the sample and/or given up to the environment. G" represents the viscous behavior of the measurement sample.

Loss factor tan $\delta = G''/G'$:

Quotient of the lost and stored deformation energy. The loss factor gives the ratio between the viscous and the elastic component of the deformation behavior.

Previously known high performance plasticizers show a rheology in the cement paste mixtures in the linear viscoelastic (LVE) region such as can be seen in FIG. 1. At the start of the measurement with low shear loading, the storage and loss moduli are at the same level (FIG. 1/I). With casein-containing samples, the storage modulus is above the loss modulus. On loading outside the linear viscoelastic region (section x/II), the storage modulus falls very markedly and suddenly in the mixtures with synthetic plasticizers (FIG. 1/II), in contrast to a mixture which is modified with casein (FIG. 2/II). In this case, a deformation outside the LVE region also causes a decrease in the storage and loss moduli, but the storage modulus is still perfectly measurable (FIG. 2/II). This also manifests itself in rising loss factors during the loading phase. This in general results in a tangent of the loss angle of <80.

If the temporarily increased deformation is brought back to the starting level, then with conventional (high performance) plasticizers a very rapid relaxation of the cement system is observed (FIG. 1/III), while with casein-containing cement pastes the relaxation proceeds comparatively slowly (FIG. 2/III). In the process, within a few minutes, generally within less than 15 minutes, the storage modulus again exceeds the loss modulus, and the starting level is again reached. This is a possible explanation for the very good self-healing of casein-containing self-spreading mixtures.

The new synthetically prepared products are characterized by rheological properties comparable to casein in flowable hydraulically setting mortar systems: here too, an increased storage modulus compared to the loss modulus is found in the range I (FIG. 3/I). In range II (FIG. 3/II), as also in the case of casein-containing SSF, a slow fall in the storage modulus to a measurable value is observed, and during relaxation a crossover of the measurement curves of the storage and loss moduli is also observed. The storage modulus is thereupon again at a higher level than the loss modulus.

The following examples serve for the further illustration of the invention:

EXAMPLES

Example 1

11.74 l of demineralized water, 234 g of acrylic acid, 1.50 kg of methacrylate-polyethylene glycol methyl ether (45 EO units) (Bisomer® S20W, 60% in $H_2O$), 336.3 g of potassium 2-acrylamido-2-methylpropanesulfonate (50% in $H_2O$) and 234.0 g of methacrylate-polypropylene glycol (9 PO units) (Blemmer® PP500) were charged beforehand into a 16 l reactor. The initial charge was heated to 80° C. and then a slug of 210 g of the initiator 2,2'-azobis(2-methylpropionamidine) dihydrochloride (WAKO® V50, 3% in $H_2O$) was added. After 5 minutes, the initiator feed was started at 400 g/hr and ran for a period of 2.5 hours.

After this, a further slug of 75 g of the initiator solution was added, the temperature was held at 80° C. for 30 minutes and the mixture was then cooled to 25° C. An 8.9% alkali-soluble dispersion with a pH of 3.1 was obtained.

Example 2

11.85 l of demineralized water, 234.4 g of acrylic acid, 1.40 kg of methacrylate-polyethylene glycol methyl ether (45 EO units) (Bisomer® S20W, 60% in $H_2O$), 468.7 g of potassium 2-acrylamido-2-methylpropane-sulfonate (50% in $H_2O$) and 468.3 g of methacrylate-polypropylene glycol (9 PO units) (Blemmer® PP500) were charged beforehand into a 16 l reactor. The initial charge was heated to 80° C. and then a slug of 210 g of the initiator 2,2'-azobis(2-methylpropionamidine) dihydrochloride (WAKO® V50, 3% in $H_2O$) was added. After 5 minutes, the initiator feed was started at 400 g/hr and ran for a period of 2.5 hours.

After this, a further slug of 75 g of the initiator solution was added, the temperature was held at 80° C. for 30 minutes and the mixture was then cooled to 25° C. An 8.4% alkali-soluble dispersion with a pH of 3.2 was obtained.

Example 3

11.83 l of demineralized water, 234.2 g of acrylic acid, 1.42 kg of methacrylate-polyethylene glycol methyl ether (45 EO units) (Bisomer® S20W, 60% in $H_2O$), 468.4 g of potassium 2-acrylamido-2-methylpropane-sulfonate (50% in $H_2O$) and 468.9 g of methacrylate-polypropylene glycol (9 PO units) (Blemmer® PP500) were charged beforehand into a 16 l reactor. The initial charge was heated to 80° C. and then a slug of 210 g of an aqueous potassium persulfate solution (3% in $H_2O$) was added. After 5 minutes, the initiator feed was started at 400 g/hr and ran for a period of 2.5 hours.

After this, a further slug of 75 g of the initiator solution was added, the temperature was held at 80° C. for 30 minutes and the mixture was then cooled to 25° C. An 8.7% alkali-soluble dispersion with a pH of 3.1 was obtained.

Example 4

11.79 l of demineralized water, 234.5 g of acrylic acid, 1.51 kg of methacrylate-polyethylene glycol methyl ether (45 EO units) (Bisomer® S20W, 60% in $H_2O$), 335.2 g of potassium 2-acrylamido-2-methylpropane-sulfonate (50% in $H_2O$) and 235.0 g of methacrylate-polypropylene glycol (9 PO units) (Blemmer® PP500) were charged beforehand into a 16 l reactor. The initial charge was heated to 80° C. and then a slug of 210 g of 2,2'-azobis(2-methylpropionamidine)dihydrochloride (WAKO® V50, 3% in $H_2O$) was added. After 5 minutes, the initiator feed was started at 400 g/hr and ran for a period of 2.5 hours.

After this, a further slug of 75 g of the initiator solution was added, the temperature was held at 80° C. for 30 minutes and the mixture was then cooled to 25° C. A 9.2% alkali-soluble dispersion with a pH of 3.3 was obtained.

Examples 5 and 6

Examples 3 and 4 were repeated with sodium persulfate as the initiator. Alkali-soluble dispersions with solids contents of 9.1 and 9.0% respectively and a pH of 3.2 were obtained.

Example 7

4.1 l of demineralized water, 1.6 l of 3% potassium hydroxide solution, 181.6 g of acrylic acid, and 1.2 kg of methacrylate-polyethylene glycol methyl ether (45 EO units) (BisomerS20W®, 60% in $H_2O$) were charged beforehand into a 16 l reactor. After this, a solution of 127.8 g of 2-acrylamido-2-methylpropanesulfonate and 24.2 g of methallylsulfonate (Geropon MLSA®) in 193.7 g of demineralized water and 181.6 g of methacrylate-polypropylene glycol ether (9 PO units) (Blemmer PP500) were added and the mixture was heated to 73° C. 433.4 g of the initiator 2,2'-azobis[2-(2-imidazolin-2-yl)propane]dihydrochloride (Wako VA-044; 10% in $H_2O$) were added over 3 hrs. After completion of the addition, the temperature was held at 73° C. and the mixture was then cooled to 25° C. A 14.5% alkali-soluble dispersion with a pH of 3.3 was obtained.

Example 8

3.9 l of demineralized water, 1.6 l of 3% potassium hydroxide solution, 181.6 g of acrylic acid, and 1.4 kg of methacrylate-polyethylene glycol methyl ether (45 EO units) (Plex-6934®, 50% in $H_2O$) were charged beforehand into a 16 l reactor. After this, a solution of 127.8 g of 2-acrylamido-2-methylpropanesulfonate and 24.2 g of methallylsulfonate (Geropon MLSA®) in 193.7 g of demineralized water and 181.6 g of methacrylate-polypropylene glycol ether (9 PO units) (Blemmer PP500) were added and the mixture was heated to 73° C. 433.4 g of the initiator 2,2'-azobis[2-(2-imidazolin-2-yl)propane]dihydrochloride (Wako VA-044; 10% in $H_2O$) were added over 3 hrs. After completion of the addition, the temperature was held at 73° C. and the mixture was then cooled to 25° C. A 14.8% alkali-soluble dispersion with a pH of 3.3 was obtained.

The dispersions from Examples 1 to 6 were subjected to a spray drying process with a polyvinyl alcohol-stabilized vinyl acetate-ethylene dispersion (solids content 58%, glass transition temperature $T_g=17°$ C.) and 5 wt. % of partially hydrolyzed polyvinyl alcohol (hydrolysis level ca. 90 mole %) with the use of 16 wt. % antiblocking agents, using a pressure nozzle in a parallel flow drying tower.

Free-flowing, redispersible, blocking-free dispersion powders (powders 1 to 6) were obtained, with a bulk density of 400 to 550 g/l.

The redispersion powders produced by spray drying were tested in comparison to commercial products in the self-leveling mixture formulation stated in Table 1. The individual components were mixed dry and then mixed with 24 g water per 100 g dry mixture.

TABLE 1

| Quantity [g] | Raw material | Manufacturer/Supplier |
|---|---|---|
| 110.0 | Ternal RG high alumina cement | Lafarge Aluminates int. |
| 240.0 | CEM I 42.5 R Portland cement | Milke-Zement GmbH & Co. KG |
| 50 | anhydrite | Hilliges Gipswerke KG |
| 1.50 | hydrated lime | Walhalla Kalkwerke |
| 269.0 | Omyacarb 20 BG calcium carbonate | Omya GmbH |
| 25.0 | RD powder 1 to 6 | |
| 300.0 | F31 quartz sand | Quarzwerke GmbH |
| 1.3 | tartaric acid | Merck Eurolab GmbH |
| 1.0 | $Li_2CO_3$ | Merck Eurolab GmbH |
| 1.0 | Agitan P 801 antifoaming agent | Münzing Chemie GmbH |
| 1.2 | Tylose H 20 P2 cellulose | Clariant GmbH |
| 1000 | | |

Performance Tests:

Determination of the Slump:

The rheology was determined in accordance with DIN EN 12706 after a time period of 1, 15, and 30 minutes.

Determination of the Flexural Tensile Strength (FTS):

The bending tensile strength was determined after 1 day (1 d) and 7 days (7 d) and was carried out on the basis of prEN 13851 on 40×40×160 mm³ prisms.

Determination of the Compressive Strength (CS):

The compressive strength was determined after 1 day (1 d) and 7 days (7 d) and was carried out on the basis of prEN 13851 on 40×40×160 mm³ standard prisms.

A mortar with a redispersion powder based on a polyvinyl alcohol-stabilized vinyl acetate-ethylene copolymer with $T_g=17°$ C. (RE5011L, Wacker Chemie, GmbH) and 4.6 ‰ casein 90 mesh (Wengenroth Co.) as dispersant was used as comparison mixture V1.

A redispersion powder based on a polyvinyl alcohol-stabilized vinyl acetate-ethylene copolymer with $T_g=21°$ C. and a solid admixed polycarboxylate ether plasticizer based on methacrylic acid/methoxy-polyethylene glycol methacrylate (ca. 17 moles ethylene oxide) was used as comparison mixture V2. This is a commercial product from the company Elotex, the powder Elotex FL51.

A redispersion powder based on a styrene-butyl acrylate copolymer with a glass transition temperature $T_g=16°$ C. and a dispersant atomization protective colloid made from a water-soluble methacrylic acid/methyl methacrylate/hydroxyethyl methacrylate copolymer (ca. 30/10/60) was used as comparison mixture V3. This is a commercial product from the company BASF AG, the powder Acronal DS 3504.

TABLE 2

| RD powder | Slump 1 min [cm] | Slump 15 mins [cm] | Slump 30 mins [cm] | FTS 1 d/7 d [N/mm²] | CS 1 d/7 d [N/mm²] |
|---|---|---|---|---|---|
| powder 1 | 16.4 | 16.3 | 16.1 | 3.91/6.30 | 14.89/23.10 |
| powder 2 | 16.2 | 16.0 | 15.9 | 3.82/6.21 | 14.98/22.91 |
| powder 3 | 15.9 | 15.8 | 15.8 | 3.96/6.41 | 15.02/23.17 |
| powder 4 | 16.2 | 16.2 | 15.9 | 3.84/6.32 | 14.79/22.67 |
| powder 5 | 16.6 | 16.4 | 16.3 | 3.95/6.38 | 14.94/23.02 |
| powder 6 | 16.3 | 16.1 | 15.8 | 3.88/6.15 | 14.82/22.73 |
| powder V1 | 16.2 | 16.1 | 15.9 | 3.61/5.78 | 14.21/21.30 |
| powder V2 | 15.7 | 15.4 | 14.2 | 3.38/5.17 | 13.89/19.14 |
| powder V3 | 13.8 | 7.2 | — | — | — |

Discussion of Results:

The modified mortars produced with the test products powders 1 to 6 show working properties for the fresh mortar comparable to the casein-containing comparison mixture V1. The slump remains almost constant with time. The initial strength values after 1 day are 4 to 10% higher than those of V1.

In the formula used, the addition of V2 and V3 causes some reduction in the slump with time and lower strength values.

Rheological Measurements:

For the measurements, the formulae stated in Table 3 were used for the reference system and the test system. Both mixtures were made up with 35 g of water per 100 g of dry mixture.

The components were premixed dry, then the water was added to the mixture and it was stirred for 1 minute at 1000 rpm with a dissolver (stirring disk ø 5 cm). The subsequent maturation time was 5 minutes with casein-containing mixtures and the test systems, and 2 minutes with cement pastes with synthetic plasticizers. Finally, all were stirred for 10 seconds at 1000 rpm.

TABLE 3

| Raw material | Reference system | Test system |
|---|---|---|
| CEM I 42.5 R Portland cement | 61 wt. % | 61 wt. % |
| Ternal RG high alumina cement | 20 wt. % | 20 wt. % |
| anhydrite | 15.3 wt. % | 15.6 wt. % |
| thickener | 0.35 wt. % | 0.35 wt. % |
| retardant | 1 wt. % | 1 wt. % |
| powder 1 with no dispersant | 2 wt. % | — |
| Melflux ® 1641* or casein plasticizer | 0.35 wt. % | — |
| powder 1 | — | 2 wt. % |

Melflux 1641 is a plasticizer powder from Degussa (SKW Polymers).

Before the start of the rheological testing, the reference and test system were adjusted to a slump of 15±0.5 cm after 1 minute by variation of the water content and/or the dispersant content. The determination was carried out on the basis of DIN EN 12706 (December 1999 issue).

The rheological tests were performed with an air bearing rheometer (MC 200, Paar-Physika Co.) with built-in cylinder measurement system (MS-Z 40 P). The initial viscosity of the cement paste was 1000-6000 mPas. Time experiments carried out in oscillation with each sample at low deformation ($\gamma$: 0.01-1%) and cycle frequency ($\omega$: 1-10/sec) confirmed that the results of the later loading and deloading tests were not attributable to initial setting processes or hardening processes.

The measurement program for the loading and deloading tests is subdivided into 3 sections. In sections 1 and 3, the oscillation measurement is performed within the linear viscoelastic region at a deformation $\gamma=0.1\%$ and a cycle frequency $\omega=10$/sec. The loading (section 2) takes place outside the linear viscoelastic region (deformation $\gamma=100\%$, cycle frequency $\omega=10$/sec).

The measurement curves obtained are illustrated in FIGS. 1 to 3.

What is claimed is:

1. In a process for the spray drying of aqueous polymer dispersions of homo- or copolymers of one or more monomers selected from the group consisting of vinyl esters of unbranched or branched alkylcarboxylic acids with 1 to 18 C atoms, acrylate esters and methacrylate esters of branched and unbranched alcohols with 1 to 15 C atoms, dienes, olefins, vinylaromatics and vinyl halides, in which a dispersant is employed, the improvement comprising selecting as at least one dispersant, a dispersant comprising at least one copolymer prepared by polymerizing a polymerizable mixture consisting essentially of:
   a) 5 to 70 wt. % of one or more monomers selected from the group consisting of ethylenically unsaturated monocarboxylic acids, ethylenically unsaturated carboxamides, ethylenically unsaturated $C_{4-8}$ dicarboxylic acids and anhydrides thereof, and (meth)acrylate monoesters of $C_{2-8}$ dialcohols;
   b) 1 to 40 wt. % of one or more monomers selected from the group consisting of ethylenically unsaturated compounds with sulfonate or sulfate functional groups,
   c) 10 to 80 wt. % of one or more monomers selected from the group consisting of ethylenically unsaturated compounds of homopolyoxyethylene glycols with 1 to 300 oxyethylene units and terminal groups selected from the group consisting of OH-groups and ether groups —OR' and mixtures thereof, wherein R' is an alkyl, aryl, alkaryl or aralkyl residue with 1 to 40 C atoms, d) 5 to 80 wt. % of one or more monomers selected from the group consisting of ethylenically unsaturated compounds of polyoxyalkylene glycols consisting of 1 to 300 $C_{3-4}$ oxyalkylene units and terminal groups selected from the group consisting of OH-groups and ether groups —OR' and mixtures thereof, wherein R' is an alkyl, aryl, alkaryl or aralkyl residue with 1 to 40 C atoms, and, e) optionally, 0.5 to 10 weight percent of one or more hydrophobic comonomers selected from the group consisting of (meth)acrylate esters of $C_{1-15}$ alcohols and vinylaromatics, said copolymer having pendant polyoxyalkylene moieties derived from monomers c) and d) the weight percentages based on the total weight of the copolymer, and totaling 100 wt. %.

2. The process of claim 1, wherein the dispersant is an atomization aid in the spray drying of aqueous dispersions of vinyl acetate homopolymers, copolymers of vinyl acetate with ethylene, copolymers of vinyl acetate with ethylene and one or more other vinyl esters, copolymers of vinyl acetate with ethylene and acrylate esters, copolymers of vinyl acetate with ethylene and vinyl chloride, styrene-acrylate ester copolymers, and/or styrene-1,3-butadiene copolymers.

3. A redispersable polymer powder composition comprising at least one copolymer, prepared by polymerizing a polymerizable mixture consisting essentially of:

a) 5 to 70 wt. % of one or more monomers selected from the group consisting of ethylenically unsaturated monocarboxylic acids, ethylenically unsaturated carboxamides, ethylenically unsaturated $C_{4-8}$ dicarboxylic acids and anhydrides thereof, and (meth)acrylate monoesters of $C_{2-8}$ dialcohols;

b) 1 to 40 wt. % of one or more monomers selected from the group consisting of ethylenically unsaturated compounds with sulfonate or sulfate functional groups, c) 10 to 80 wt. % of one or more monomers selected from the group consisting of ethylenically unsaturated compounds of homopolyoxyethylene glycols with 1 to 300 oxyethylene units and terminal groups selected from the group consisting of OH-groups and ether groups —OR' and mixtures thereof, wherein R' is an alkyl, aryl, alkaryl or aralkyl residue with 1 to 40 C atoms, d) 5 to 80 wt. % of one or more monomers selected from the group consisting of ethylenically unsaturated compounds of polyoxyalkylene glycols consisting of 1 to 300 $C_{3-4}$ oxyalkylene units and terminal groups selected from the group consisting of OH-groups and ether groups —OR' and mixtures thereof, wherein R' is an alkyl, aryl, alkaryl or aralkyl residue with 1 to 40 C atoms, and, e) optionally, 0.5 to 10 weight percent of one or more hydrophobic comonomers selected from the group consisting of (meth)acrylate esters of $C_{1-15}$ alcohols and vinylaromatics, said copolymer having pendant polyoxyalkylene moieties derived from monomers c) and d) the weight percentages based on the total weight of the copolymer, and totaling 100 wt. %, further comprising an aqueous dispersion comprising a homo- or copolymer of one or more monomers selected from the group consisting of vinyl esters of optionally branched $C_{1-18}$ alkylcarboxylic acids, (meth)acrylate esters, of optionally branched $C_{1-15}$ alcohols, dienes, olefins, vinyl aromatics, and vinyl halides, and spray drying the aqueous polymer dispersion to form said redispersible polymer powder composition.

4. The composition of claim 3, wherein the homo- and copolymers of the aqueous polymer dispersion are selected from the group consisting of vinyl acetate homopolymers, vinyl acetate/ethylene copolymers, copolymers of vinyl acetate, ethylene, and at least one vinyl ester other than vinyl acetate, copolymers of vinyl acetate, ethylene and acrylate ester(s), copolymers of vinyl acetate, ethylene, and vinyl chloride, styrene/acrylate ester copolymers, styrene/1-3-butadiene copolymers, styrene/1-3-butadiene copolymers, and mixtures thereof.

5. The composition of claim 3, wherein the copolymer of the aqueous polymer dispersion is an ethylene/vinyl acetate copolymer.

6. A construction chemical composition containing at least one hydraulically setting binder selected from the group consisting of Portland cement, aluminate cement, trass cement, slag cement, magnesia cement, phosphate cement, gypsum, lime, and waterglass, which is a self-leveling floor filler or flowable screed, containing a redispersible polymer powder composition of claim 3.

7. The composition of claim 6, wherein said dispersant exhibits a plasticizing action.

* * * * *